United States Patent Office 3,629,124
Patented Dec. 21, 1971

3,629,124
BLEACHING, STERILIZING, DISINFECTING, AND DETERGING COMPOSITIONS
Thomas M. King, St. Louis, Mo., assignor to Monsanto Company, St. Louis, Mo.
No Drawing. Filed Aug. 27, 1969, Ser. No. 853,512
Int. Cl. C11d 7/56
U.S. Cl. 252—99
20 Claims

ABSTRACT OF THE DISCLOSURE

Compositions containing a chlorine-releasing agent such as sodium hypochlorite, an amino phosphonic acid (or water-soluble salt) such as amino tri(methylene phosphonic acid)—$N(CH_2PO_3H_2)_3$, and a stabilizing material for preventing chemical interaction between said agent and acid (or ionized form thereof) when both are in an aqueous solution, such as zinc sulfate. These compositions have a variety of utilities including scouring cleansers.

---

The present invention pertains to a method for imparting threshold-sequestering capabilities to a chlorine-releasing agent and to the use of said agent in bleaching, sterilizing, disinfecting, and deterging compositions and to the resulting compositions.

Since bleaching, sterilizing, disinfecting, and deterging compositions are customarily used in aqueous systems where oftentimes the water is hard or contaminated, certain metal ions such as calcium and magnesium and the like can oftentimes be particularly troublesome in most of the foregoing applications. In addition, when using a chlorine-releasing agent in most of the foregoing applications, these metallic ions oftentimes interfere with the action of the agent and cause the agent to be less effective and sometimes essentially non-effective. Therefore, the use of sequestering or chelating or threshold agents such as amino phosphonic acids, for example, amino tri-(methylene phosphonic acid), tri(lower alkylidene phosphonic acids), should be extremely well-suited for use with chlorine-releasing agents in the foregoing applications in order to prevent or minimize the effects of such ions. However, it has not been possible to utilize these amino phosphonic acids with the chlorine-releasing agents because such acids react rapidly with these agents, which form hypochlorite ions in aqueous solutions, and thus lose their threshold-sequestering ability in the presence of the hypochlorite ion while degrading the chlorine-releasing agents per se and thus, in turn, limiting their effectiveness. As can be appreciated, therefore, a method for imparting threshold-sequestering capabilities to a chlorine-releasing agent in aqueous media by the use of amino phosphonic acids threshold-sequestering agent which is stable in the presence of a chlorine-releasing agent (i.e. the hypochlorite ion in solution) would represent a substantial contribution to and an important advancement in this art.

An object of this invention is to provide a method for imparting threshold-sequestering capabilities to a chlorine-releasing agent in aqueous media.

Another object of this invention is to provide a method for promoting chemical compatibility between a chlorine-releasing agent in aqueous media with a sequestering agent.

A still further object of this invention is to provide bleaching, sterilizing, disinfecting and deterging compositions which have incorporated therein a chlorine-releasing agent, a sequestering-threshold agent, and a stabilizing material which renders said agent effective in the presence of the chlorine-releasing agent.

Other objects will become apparent from the subsequent detailed description and the appended claims.

In general, the present invention provides unique and novel bleaching, sterilizing, disinfecting and deterging compositions which comprise a combination of (1) an amino phosphonic acid such as amino tri(methylene phosphonic acid) which functions as a threshold (and sequestering) agent; (2) a chlorine-releasing agent such as sodium hypochlorite; and (3) a stabilizing material such as zinc sulfate which prevents substantial or complete interaction between (1) and (2).

It has been found that the use of a stabilizing material, either organic or inorganic, which is at least slightly soluble in water and which does not substantially adversely affect the chlorine-releasing agent and/or threshold-sequestering agent in an aqueous media and which provides metallic ions of copper, zinc, aluminum, cadmium, cobalt and nickel in the aqueous media, renders the chlorine-releasing agent and the amino phosphonic acid compatible with each other when all three ingredients are in the aqueous media. In other words, this stabilizing material prevents the amino phosphonic acid from reacting with the chlorine-releasing agent or being chemically attacked by the chlorine-releasing agent.

The attack of the chlorine-releasing agent (i.e., the hypochlorite ion in solution) upon the threshold-sequestering agent (such as amino trimethylene phosphonic acid), herein referred to as ATMP, was a problem in the art (prior to the present invention), which in itself was unexpected in view of the prior art. For example, in U.S. 3,278,446, it is specifically taught that the amino tri(lower alkylidene phosphonic) acids have a unique characteristic of being "hydrolytically stable." In column 2, lines 12 through 46, these amino phosphonic acids were specifically tested in the presence of hydrochloric acid for a period of four hours at boiling point. At the end of this time there was no apparent degradation of or chemical attack on the amino phosphonic acids. However, these amino phosphonic acids in the presence of a hypochlorite ion, $-OCl$, in an aqueous medium, results in the degradation of these such acids within a very rapid period of time. Thus, this degradation by the hypochlorite ion in solution was unique, particularly in view of the prior art teaching (as exemplified by U.S. 3,278,446) which would suggest to one having skill in the art that such amino phosphonic acids would be "hydrolytically stable" in the presence of ionized chlorine notwithstanding the chemical ionic form. However, the applicant successfully solved this problem via his inventive skill by incorporating a stabilizing material which, when contacted with water, provides one of the aforementioned six metallic ions, which in turn "protects" the threshold-sequestering agent from chemical attack by the chlorine-releasing agent. The exact mechanism of this "protection," however, is not presently known.

Illustrative examples of the stabilizing material which are set forth for exemplary purposes only and hence non-restrictive, include zinc acetate, zinc bromate, zinc benzoate, zinc borate, zinc bromide, zinc butyrate, zinc caproate, zinc carbonate, zinc chlorate, zinc chloride, zinc citrate, zinc fluoride, zinc fluosilicate, zinc formate, zinc hydroxide, zinc d-lactate, zinc laurate, zinc permanganate, zinc nitrate, zinc hypophosphite, zinc salicylate, zinc sulfate and zinc sulfite; copper acetate, copper benzoate, copper metaborate, copper bromate, copper bromide, copper butyrate, copper chromate, copper chlorate, copper chloride, copper fluoride, copper fluo-silicate tetra- and hexa-hydrate, copper formate, copper lactate, copper laurate, copper nitrate, copper sulfate, copper sulfide; aluminum acetate, aluminum benzoate, aluminum bromate, aluminum bromide, aluminum chlorate, aluminum chloride, aluminum fluoride, aluminum lactate, aluminum nitrate, aluminum sulfate; cadmium acetate, cadmium benzoate, cadmium borate, cadmium bromide, cadmium chlorate, cadmium chloride, cadmium fluoride, cadmium fluosilicate, cadmium formate, cadmium fumarate, cadmium lactate, cadmium maleate, cadmium permanganate, cadmium nitrate, cadmium pyrophosphate, cadmium salicylate, cadmium sulfate, cadmium sulfide; cobalt acetate, cobalt benzoate, cobalt bromate, cobalt bromide, cobalt chlorate, cobalt chloride, cobalt citrate, cobalt fluoride, cobalt fluosilicate, cobalt formate, cobalt nitrate, cobalt orthophosphate, cobalt sulfate, cobalt tartrate; nickel bromate, nickel bromide, nickel chlorate, nickel perchlorate, nickel chloride, nickel fluoride, nickel formate, nickel nitrate, nickel hypophosphite, and nickel sulfate. It is to be understood that the above examples do not constitute an all inclusive list, and that mixtures of the aforementioned materials or any organic or inorganic stabilizing material which provides one of the six metallic ions in an aqueous solution is within the scope of the present invention. The preferred stabilizing materials are from the group copper, zinc, aluminum, cadmium, cobalt and nickel sulfates, chlorides and nitrates.

The amount of the aforementioned stabilizing material which is utilized in the compositions of the present invention is dependent upon the amount of sequestering-threshold agent utilized. In general, it has been found that it is desirable to have a molar ratio of specific ionic metal to the threshold-sequestering agent of at least 0.5:1. Preferably the molar ratio is from about 1:1 to about 5:1. However, higher amounts of the ionic metal can be utilized, as long as these higher amounts do not adversely affect the desired end result. The particular physical form of the stabilizing material is not a critical limitation of the present invention. It is a requirement, however, that the stabilizing material be slightly soluble in water, for example, at least five parts of stabilizing material per million parts of water, and that the rate of solubility of said stabilizing material be sufficiently rapid in order to protect the sequestering-threshold agent if all the ingredients are contacted with water at one time.

The amino phosphonic acid sequesternig-threshold agents which form one of the ingredients in the present invention compositions are the amino phosphonic acids, or a salt thereof, said acids being of the following general formula:

(I) 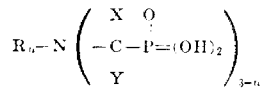

wherein: $n$ represents an integer 0 or 1; X and Y represent hydrogen or alkyl; R represents hydrogen, aliphatic hydrocarbon, halo-substituted aliphatic hydrocarbon, hydroxy-substituted aliphatic hydrocarbon or:

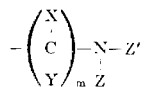

wherein: $m$ represents an integer from 1 to 30; X and Y represent hydrogen or alkyl; Z represents hydrogen or

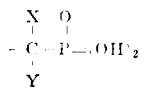

Z' represents

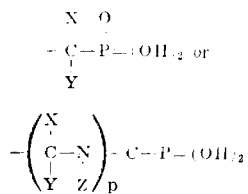

wherein: $p$ represents an integer from 1 to 30. As used hereinafter the term "amino phosphonic acids" generically describes all of the foregoing.

With respect to the foregoing general formula it should be noted that when R is either an aliphatic hydrocarbon, halo-substituted aliphatic hydrocarbon or hydroxy-substituted aliphatic hydrocarbon, it is preferably either the saturated or double-bonded unsaturated form containing from 1 to 30 carbon atoms with 6 to 30 carbon atoms being particularly preferred. When either X or Y is an alkyl group it is preferred that the alkyl group contains from 1 to 30 carbon atoms with lower alkyl groups containing from 1 to about 4 carbon atoms being particularly preferred.

One of the preferred classes of the foregoing amino phosphonic acids are the amino tri(lower alkylidene phosphonic acids) or the water-soluble salts thereof and which acids have the general formula:

(II) 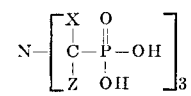

wherein X and Y are the same as defined above, i.e., either hydrogen or alkyl.

The following compounds are presented as being illustrative of the amino phosphonic acids:

(1) $N(CH_2PO_3H_2)_3$
(2) $N[C(CH_3)(CH_3)PO_3H_2]_3$
(3) $CH_3N(CH_2PO_3H_2)_2$
(4) $nC_4H_9N(CH_2PO_3H_2)_2$
(5) $(H_2O_3PCH_2)_2NCH_2CH_2N(CH_2PO_3H_2)_2$
(6) $(H_2O_3PCH_2)_2NCH_2CH_2N(CH_2PO_3H_2)CH_2CH_2N(CH_2PO_3H_2)_2$
(7) $(H_2O_3PCH_2)_2NCH_2CH_2[N(CH_2PO_3H_2)(CH_2CH_2)]_2N(CH_2PO_3H_2)_2$
(8) $nC_{18}H_{35}N(CH_2PO_3H_2)_2$
(9) $OHCH_2CH_2N(CH_2PO_3H_2)_2$
(10) $ClCH_2CH_2CH_2N(CH_2PO_3H_2)_2$
(11) $(H_2O_3PCH_2)_2N(CH_2)_6N(CH_2PO_3H_2)_2$
(12) $(H_2O_3PCH_2)_2N(CH_2)_{10}N(CH_2PO_3H_2)_2$
(13) $C_{12}H_{25}N(CH_2PO_3H_2)_2$
(14) $C_{10}H_{21}N(CH_2PO_3H_2)_2$
(15) $C_6H_{13}N(CH_2PO_3H_2)_2$
(16) $ClCH_2(CH_2)_{11}N(CH_2PO_3H_2)_2$
(17) $C_3H_6N(CH_2PO_3H_2)_2$
(18) $OHCH_2(CH_2)_{13}N(CH_2PO_3H_2)_2$
(19) $C_{20}H_{41}N(CH_2PO_3H_2)_2$
(20) $(H_2O_3PCH_2)_2N(CH_2)_6N(CH_2PO_3H_2)(CH_2)_6N(CH_2PO_3H_2)_2$
(21) $C_{15}H_{31}N(CH_2PO_3H_2)_2$
(22) $FCH_2(CH_2)_5N(CH_2PO_3H_2)_2$
(23) $CH_3CH_2CH_2CH_2CH(OH)CH_2N(CH_2PO_3H_2)_2$
(24) $CH_3CH(Br)CH_2N(CH_2PO_3H_2)_2$
(25) $C_8H_{17}N(CH_2PO_3H_2)_2$

The amino phosphonic acids and their salts may be prepared by various means, one of which comprises as a first step the preparation of the corresponding esters by reacting under reactive conditions a primary amine or ammonia, a compound containing a carbonyl group such as an aldehyde or ketone, and a dialkylphosphite. The free amino phosphonic acids and their salts may be prepared by hydrolysis of the esters using strong mineral acids such as hydrochloric acid and the like. These amino phosphonic acids per se and processes for preparing the same are either partially or fully disclosed in U.S. 3,234,124; U.S. 3,288,846; U.S. 3,336,221; and U.S. 3,346,488, all of which publications should be considered as incorporated herein by reference.

It is to be understood that the term "threshold" as utilized herein refers to the chemical and/or physical phenomenon that less than stoichiometric quantities of the particular amino phosphonic acid can effectively prevent the precipitation of various metallic ions such as calcium and magnesium in water. In other words, the "threshold" treatment of water is that technique by means of which less than stoichiometric quantities of the treating agent are added to interfere with the growth of crystal nuclei and thereby prevent the deposition of insoluble deposits. The term is applied, for example, to the treatment of water with polyphosphates and is discussed in references such as U.S. Pat. No. 2,038,316, and the article by Reitmeier and Buehrer in the Journal of Physical Chemistry, vol. 44, pages 535 to 574 (1939). An additional explanation of the threshold effect will be found in the publications of Hatch and Rice appearing in Industrial Engineering and Chemistry of January 1939 and August 1945. All of the aforementioned publications are to be considered as incorporated herein by reference.

Although in general, any water-soluble salt of the amino phosphonic acids may be employed, the alkali metal salts are preferred, and, in particular, the sodium salts; however, other alkali metal salts, such as potassium, lithium, and the like, as well as mixtures of the alkali metal salts, may be substituted therefor. In addition, any water-soluble salt, as well as mixtures of water-soluble salts, such as the ammonium salts and the amine salts, which exhibit the characteristics of the alkali metal salts may be used to practice the invention. In particular, amine salts prepared from low molecular weight amines, i.e., having a molecular weight below about 300, and more particularly the alkyl amines, alkylene amines and alkanol amines containing not more than 2 amine groups, such as, ethyl amine, diethylamine, propylamine, propylenediamine, hexylamine, 2-ethyl hexylamine, N-butylethanol amine, triethanol amine and the like, are the preferred amine salts.

The chlorine-releasing agents which are suitable for use in the instant invention are those water-soluble organic and inorganic compounds which are believed to have oxidizing power by virtue of containing "available-chlorine" which can react in aqueous solution to form hypochlorous acid or the hypochlorite ion. Such organic compounds include the alkyl hypochlorites and especially the lower alkyl hypochlorites, such as ethyl hypochlorite, propyl hypochlorite, n-butyl hypochlorite and tert-butyl hypochlorite; the N-chlorinated heterocyclic compounds and especially the five and six membered N-chlorinated heterocyclic compounds, such as, hydantoin, N-chlorosuccinimide and the triazines, such as, the cyanuric acids and salts which include trichloroisocyanuric acid, dichloroisocyanuric acid, sodium dichloroisocyanurate, and potassium dichloroisocyanurate, [(monotrichloro) tetra-(monopotassium dichloro)] penta-isocyanurate (which is disclosed along with other hypochlorite-forming materials in U.S. 3,150,132 which is incorporated herein by reference), as well as melamine, ammeline and ammelide; and the N-chloro aromatic and substituted aromatic sulfonamides, such as, sodium benzenesulfochloroamide, sodium nitrobenzenesulfochloroamide and sodium p-toluenesulfochloroamide. Such inorganic compounds include the alkali metal chlorine containing compounds, such as, sodium hypochlorite, sodium chlorite aand lithium hypochlorite, the alkaline earth metal chlorine containing compounds, such as calcium hypochlorite and barium hypochlorite, and the "chlorinated trisodium phosphates," a class of compounds which consist of physico-chemical combination in unitary crystalline form of trisodium phosphate and sodium hypochlorite. The "chlorinated trisodium phosphates" are known and are described along with their methods of preparation, in publications such as U.S. 1,555,474 or U.S. 1,956,304, both of which are incorporated herein by reference.

The term "active" or "available" chlorine is commonly used in the hypochlorite bleaching and sterilizing art to refer to atomic or "nascent" chlorine. Such chlorine differs from normally occurring chlorine in that the latter occurs in molecular form and each molecule contains *two atoms* of chlorine. When employed for bleaching purposes the "active" or "available" chlorine has twice the oxidizing or bleaching activity of molecular chlorine based on the weight (molecular) of the normally occurring molecular chlorine. Thus, the terms "active" or "available" chlorine are generally expressed as twice the amount in terms of percent of the chlorine present in a molecule of material.

Due to the many and varied chlorine-releasing agents which vary in molecular weight and available chlorine over a wide range and the fact that the amounts of the chlorine-releasing agent used in many applications are based on the available chlorine content, the amounts suitable for use herein unless otherwise indicated will be based on percent available chlorine per total weight of the particular composition. By knowing the molecular weight of the particular chlorine-releasing agent, its available chlorine, and the available chlorine desired expressed in percent available chlorine per total weight of the particular composition, the necessary amounts on a weight basis can readily be determined.

The threshold-sequestering agents representative of the instant invention (along with the stabilizing material) may be incorporated in a liquid chlorine-releasing agent in order to impart threshold-sequestering capabilities thereto, such as, a 5% solution of hypochlorite bleach, which is usually further diluted to from about .01 to 1% bleach solution when used as a household bleach. In addition, where one so desires to incorporate the threshold-sequestering agent in dry bleach compositions, such as the chlorinated cyanuric acids and salts and the chlorinated trisodium phosphates, the stabilizing material is also desirably admixed with the dry bleaches and then the resulting composition dissolved in the aqueous system immediately preceding its end use application. Because of the many advantages derived from dry bleach compositions, it is therefore preferred that the threshold-sequestering agent and stabilizing material be admixed with the dry chlorine-releasing agent. In any event, the combination of the threshold-sequestering agent and stabilizing material is intended to be used with the chlorine-releasing agent in an aqueous system for such end use applications as bleaching, sterilizing, disinfecting and cleansing.

The proportions of the chlorine-releasing agent to the threshold-sequestering agent may be varied over a wide range depending upon the available chlorine desired and also the application involved. Usually proportions of the chlorine-releasing agent to threshold-sequestering agent of between about 1:50 to about 5,000:1 on a percent available chlorine to weight of threshold-sequestering agent basis are preferred. In general, for most end use applications the amount of threshold-sequestering agent necessary is usually at least 0.00001% (for threshold applications) and between about 0.01 to 2% (for sequestering application) by weight of the aqueous solution and the usual available chlorine may vary from about 0.001 to 0.05% available chlorine per weight of aqueous solution.

In accordance with the present invention, novel compositions of matter having oxidizing, bleaching, detergent and disinfecting properties may be prepared by admixing the chlorine-releasing agent, the threshold-sequestering agent and the stabilizing material with a wide variety of organic or inorganic components. Such components include, for example, inorganic phosphates such as the alkali metal (especially sodium and potassium) tripolyphosphates, pyrophosphates, orthophosphates (i.e., mono-, di- and trisodium orthophosphates), and mixtures of these and inert additives such as the alkali metal (especially sodium and potassium) carbonates, borates, silicates, metasilicates, sulfates, chlorides and mixtures of these. In addition to the foregoing, wetting agents, synthetic surfactants, especially anionic surfactants such as the alkali metal salts of organic sulfonates or sulfates containing an alkyl group of from about 8 to 22 carbon atoms, particularly the sodium salts, such as alkyl aryl sulfonates (sodium dodecyl benzene sulfonate), sulfates of primary alcohols (sodium lauryl sulfate) and the like, soaps, fillers, abrasives (such as silica or feldspar), may be incorporated in the composition usually in minor amounts (i.e., less than 50% by weight of the composition) to impart special properties.

In conjunction with the incorporation of synthetic surfactants in the novel compositions of the present invention, this latter category also includes the anionic surfactants such as the sulfated and the sulfonated alkyl, aryl and alkylaryl hydrocarbons set forth in U.S. Pat. 2,846,-398, line 54 of column 3 to line 6 in column 5. It is also within the scope of the present invention to include those non-ionic surfactants such as those set forth in column 5 of U.S. 2,846,398 and other well known cationic surfactants. Other typical examples of such various surfactants are described in Schwartz and Perry, "Surface Active Agents," Inter-Science Publishers, New York (1949), and the Journal of American Oil Chemists Society, and those detergent surface active compounds which are specifically described in U.S. 3,308,067 (line 3 of column 7 through line 36 of column 9). All of the aforementioned publications should be considered as incorporated herein by reference.

It is also within the scope of the present invention to utilize as an additional component (ingredient) of the aforementioned oxidizing, bleaching, detergent and disinfecting composition a class of alkylenediphosphonic acids (the salts thereof and mixtures of the acids and/or salts) which are suggested in U.S. 3,297,578, which is incorporated herein by reference, as sequestering agents for imparting sequestering capabilities to chlorine-releasing agents such as those heretofore described; however, these alkylene diphosphonic acids are stable per se in the presence of the chlorine-releasing agents. In other words, the combination of the alkylene diphosphonic acids and chlorine releasing agents does not require a stabilizing material, ibid., since this combination is stable per se, as taught in U.S. 3,297,578.

The alkylene diphosphonic acids have the general formula (III)

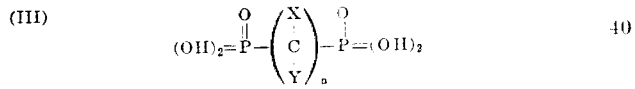

wherein $n$ is an integer from 1 to 10, X represents hydrogen or lower alkyl (1–4 carbon atoms, such as methyl, ethyl, n-propyl, n-butyl and isomers thereof), and Y represents hydrogen, hydroxyl or lower alkyl (1–4 carbon atoms, such as methyl, ethyl, n-propyl, n-butyl and isomers thereof).

Compounds illustrative of these alkylene diphosphonic acids include the following:

(26) methylenediphosphonic acid, $(OH)_2(O)PCH_2P(O)(OH)_2$

(27) ethylidenediphosphonic acid, $(OH)_2(O)PCH(CH_3)P(O)(OH)_2$

(28) isopropylidenediphosphonic acid, $(OH)_2(O)PC(CH_2CH_3)P(O)(OH)_2$

(29) 1 hydroxy, ethylidenediphosphonic acid, $(OH)_2(O)PC(OH)(CH_3)P(O)(OH)_2$

(30) hexamethylenediphosphonic acid,
$(OH)_2(O)PCH_2(CH_2)_4CH_2P(O)(OH)_2$
(31) trimethylenediphosphonic acid,
$(OH)_2(O)P(CH_2)_3P(O)(OH)_2$
(32) decamethylenediphosphonic acid,
$(OH)_2(O)P(CH_2)_{10}P(O)(OH)_2$
(33) 1-hydroxy, propylidenediphosphonic acid,
$(OH)_2(O)PC(OH)(CH_2CH_3)P(O)(OH)_2$
(34) 1,6-dihydroxy, 1,6-dimethyl, hexamethylenediphosphonic acid, $(OH)_2(O)PC(CH_3)(OH)(CH_2)_4C(CH_3)(OH)P(OH)_2$

(35) 1,4-dihydroxy, 1,4-diethyl, tetramethylenediphosphonic acid, $(OH)_2(O)PC(C_2H_5)(OH)(CH_2)_2C(C_2H_5)(OH)P(O)(OH)_2$
(36) 1,3-dihydroxy, 1,3-dipropyl, trimethylenediphosphonic acid, $(OH)_2(O)PC(C_3H_7)(OH)(CH_2)C(C_3H_7)(OH)P(O)(OH)_2$
(37) 1,4-dibutyl, tetramethylenediphosphonic acid, $(OH)_2(O)PCH(C_4H_9)(CH_2)_2CH(C_4H_9)P(O)(OH)_2$
(38) dihydroxy, diethyl, ethylenediphosphonic acid, $(OH)_2(O)PC(OH)(C_2H_5)C(OH)(C_2H_5)P(O)(OH)_2$
(39) tetrabutyl, butylenediphosphonic acid, $(OH)_2(O)P[CH(C_4H_9)]_4P(O)(OH)_2$
(40) 4-hydroxy, 6-ethyl, hexamethylenediphosphonic acid $(OH)_2(O)PCH_2CH_2CH_2CH(OH)CH_2CH(C_2H_5)P(O)(OH)_2$ These alkylenediphosphonic acids and their salts may be prepared by various means, one of which comprises as a first step the preparation of the corresponding ester by the following general reactions:

(1) For the alkylidenediphosphonic acids and their salts where $n > 1$.

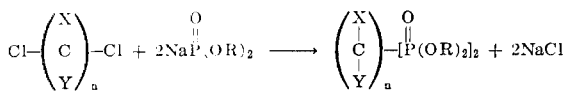

(2) For the alkylidenediphosphonic acids and their salts where $n = 1$.

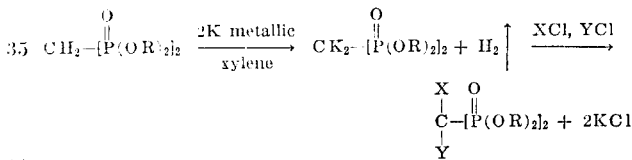

(3) For the alkylenediphosphonic acids and their salts

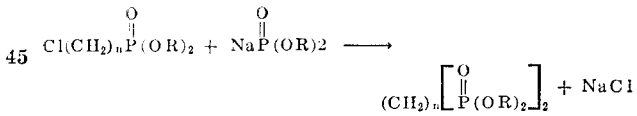

(4) For the 1 hydroxy, alkylenediphosphonic acids and their salts.

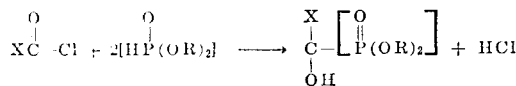

wherein $n$, X and Y are the same as in the foregoing general formula and R represents an alkyl group.

The free alkylenediphosphonic acids and their salts may be prepared by hydrolysis of the ester using strong mineral acids such as hydrochloric acid and the like.

These alkylidene diphosphonic acids or water soluble salts thereof are used in amounts of at least 0.00001% (for threshold purposes) and up to as high as 50% by weight (for sequestering or as a detergent builder). Generally, the range of 0.00001% by weight to about 7% by weight is the usual amount when employed for threshold-sequestering purposes, based on the total weight of the composition or aqueous solution.

The following illustrative examples are set forth for a more complete understanding of the present invention.

EXAMPLE I

In order to illustrate the relative stability of various amino phosphonic acids in aqueous solutions containing chlorine-releasing agents, the following tests and comparisons are made with the indicated results. Specifically, thirteen separate and individual aqueous solutions at 25° C. are prepared containing 5% by weight of a mixture of the sequestering agent indicated by compound number in Table I and a stabilizing material also indicated in Table I. The exact mole ratio of the metallic ion of the stabilizing material to the sequestering agent is shown in Table I. Each of the aqueous solutions also contains 1.5% by weight of either sodium hypochloride or trichlorocyanuric acid. The solutions are adjusted to pH 10 with NaOH. The evaluation of the effectiveness for end-use application of each solution is determined by measurements made of the percent original available chlorine remaining after one hour, with the hypochloride being determined iodometrically by thiosulfate titration. For comparative purposes, thirteen similar test solutions are prepared in the same manner as set forth above, with the exception that the aforementioned stabilizing material is omitted, and the sequestering agent is present in an amount of 1.5% by weight based on the total weight of the aqueous solution. Table I indicates the results of the above comparisons.

TABLE I

| (A) Sequestering agent (Compound No.) [1] | 1 | 3 | 5 | 6 | 7 | 9 | 11 |
|---|---|---|---|---|---|---|---|
| (B) Stabilizing material | $ZnSO_4$ | $ZnSO_4$ | $ZnSO_4$ | $CuCl_2$ | $CuCl_2$ | $Al_2NO_3$ | $Al_2NO_3$ |
| (C) Chlorine-releasing agent | NaOCl | NaOCl | NaOCl | $C_3N_3Cl_3$ | $C_3N_3Cl_3$ | $C_3N_3Cl_3$ | $C_3N_3Cl_3$ |
| (D) Mole ratio of ion/sequestering agent | 1.5/1 | 1.5/1 | 1.5/1 | 2/1 | 2/1 | 1/1 | 1/1 |
| (E) Original hypochlorite remaining (percent): | | | | | | | |
| 1. With stabilizing material | 90 | 91 | 86 | 93 | 93 | 97 | 91 |
| 2. Without stabilizing material | 0.6 | 1.4 | 1.3 | 3.7 | 0.7 | 0.9 | 2.1 |

| (A) Sequestering agent (Compound No.) [1] | 12 | 13 | 18 | 20 | 23 | 25 |
|---|---|---|---|---|---|---|
| (B) Stabilizing material | $Al\text{-}(C_2H_3O_2)_3$ | $Zn\text{-}(C_2H_3O_2)_3$ | $ZnCl_2$ | $CaSO_4$ | $Co\text{-}(NO_3)_2$ | $Ni\text{-}(NO_3)_2$ |
| (C) Chlorine-releasing agent | $C_3N_3Cl_3$ | $C_3N_3Cl_3$ | NaOCl | NaOCl | NaOCl | NaOCl |
| (D) Mole ratio of ion/sequestering agent | 1/1 | .75/1 | .5/1 | 4/1 | 4/1 | 4/1 |
| (E) Original hypochlorite remaining (percent): | | | | | | |
| 1. With stabilizing material | 92 | 98.5 | 90.5 | 89 | 91 | 90 |
| 2. Without stabilizing material | 1.5 | 10.5 | 1.1 | 1.9 | 2.2 | 1.6 |

[1] See column 4.

Referring to Table I, it is quite apparent that the specific amino phosphonic sequestering agents would not be considered suitable in many applications for use with a chlorine-releasing agent in aqueous solution in the absence of a stabilizing material. Specifically, Table I shows that in the presence of a stabilizing material the original hypochloride remaining in solution is from about 86% to about 98.5%, whereas in the absence of the stabilizing material only about 2.1 to about 0.6% of the original hypochloride remains. The attack of the hypochloride ion on the amino phosphonic acid is thus readily demonstrated. This dramatically illustrates the unique and totally unexpected compatibility between the amino phosphonic acids representative of the instant invention and a chlorine-releasing agent of the instant invention in the presence of a stabilizing material.

In order to demonstrate the threshold properties of the aforementioned thirteen solutions containing the indicated threshold-sequestering compound, Nos. 1, 3, 5, 6, 7, 9, 11, 12, 13, 18, 20, 23 and 25, the stabilizing material and the chlorine-releasing agent, each solution is diluted with water in order to provide a resultant solution containing 10 parts (per million parts of water) of the aforementioned threshold compound. To each diluted solution is added sufficient quantities of sodium sulfate and calcium chloride in order to provide a resultant solution containing 6500 parts per million of calcium sulfate. In each case, there is substantially no noticeable sedimentation or precipitation. By converting the parts per million of the threshold agent and the calcium sulfate to a molar basis, it is readily seen that the specific threshold agent substantially inhibits the precipitation of substantially more than a 1:1 molar ratio of calcium sulfate to threshold agent.

EXAMPLE II

For household dry bleaching the following additives within the ranges specified when incorporated with the chlorine-releasing agent give an effective formulation.

Chlorine-releasing agent,[1] percent available chlorine per
   total weight of formulation _____ 5 to 10.
Additives, percent by weight:
   Stabilizing material (zinc chloride) _____ 0.01 to 15.
   Threshold-sequestering amino phosphonic acid agent_ 0.0001 to 50.
   Inorganic phosphate [2] _____ 0 to 50.
   Inert additive [3] _____ 30 to 75.
   Organic anionic surfactant _____ 0 to 10.

[1] Chlorinated trisodium phosphate, trichloroisocyanuric acid, dichloroisocyanuric acid, sodium dichloroisocyanurate, potassium dichloroisocyanurate or mixtures of these.
[2] Sodium or potassium -tripolyphosphate, -pyrophosphate, -orthophosphate or mixtures of these.
[3] Sodium or potassium -carbonates, -borates, -silicates, -metasilicates, -sulfates, -chlorides or mixtures of these.

The following dry composition (parts by weight) is especially adapted for use as a household dry bleach in an aqueous system at a concentration of about 50 p.p.m. to 100 p.p.m. available chlorine for bleaching and stain removal.

| | |
|---|---|
| Potassium dichloroisocyanurate | 13.0 |
| Sodium tripolyphosphate | 25.0 |
| Amino tri(methylene phosphonic acid) | 4.2 |
| Zinc chloride | 0.8 |
| Sodium sulfate | 55.0 |
| Sodium dodecyl benzene sulfonate | 2.0 |
| | 100.0 |

EXAMPLE III

For commercial laundry bleaches the following additives within the ranges specified when incorporated with the chlorine-releasing agent give an effective formulation.

Chlorine-releasing agent,[1] percent available chlorine per
   total weight of formulation _____ 5 to 20.
Additives, percent by weight:
   Stabilizing material (copper nitrate) _____ 0.01 to 15.
   Threshold-sequestering amino phosphonic acid agent_ .00001 to 50.
   Inorganic phosphate [2] _____ 0 to 50.
   Inert additive [3] _____ 30 to 50.
   Organic anionic surfactant _____ 0 to 5.

[1] Chlorinated trisodium phosphate, trichloroisocyanuric acid, dichloroisocyanuric acid, sodium dichloroisocyanurate, potassium dichloroisocyanurate or mixtures of these.
[2] Sodium or potassium -tripolyphosphate, -pyrophosphate, -orthophosphate or mixtures of these.
[3] Sodium or potassium -carbonates, -borates, -silicates, -metasilicates, -sulfates, -chlorides or mixtures of these.

The following dry composition (parts by weight) is especially adapted for use as a commercial laundry dry bleach when used in an aqueous system at the rate of about 2 ounces per 100 pounds of clothes.

| | |
|---|---|
| Trichloroisocyanuric acid | 17.0 |
| Ethylene diamine tetra(methylene phosphonic acid) | 9.0 |
| Copper nitrate | 1.0 |
| Tetrasodium pyrophosphate | 35.0 |
| Sodium sulfate | 35.0 |
| Sodium dodecylbenzene sulfonate | 3.0 |
| | 100.0 |

EXAMPLE IV

For scouring cleansers the following additives within the ranges specified when incorporated with a chlorine-releasing agent give an effective formulation.

| | |
|---|---|
| Chlorine-releasing agent,[1] percent available chlorine per total weight of formulation | 0.2 to 1.0 |
| Additives, percent by weight: | |
| Stabilizing material (cadmium sulfate) | .01 to 15 |
| Threshold-sequestering amino phosphonic acid agent | .00001 to 5 |
| Inorganic phosphate [2] | 0 to 4 |
| Inert additive [3] | 0 to 4 |
| Organic anionic surfactant | 1 to 5 |
| Abrasive | 90 to 98 |

[1] Chlorinated trisodium phosphate, trichloroisocyanuric acid, dichloroisocyanuric acid, sodium dichloroisocyanurate, potassium dichloroisocyanurate or mixtures of these.
[2] Sodium or potassium -tripolyphosphate, -pyrophosphate, -orthophosphate or mixtures of these.
[3] Sodium or potassium -carbonates, -borates, -silicates, -metasilicates, -sulfates, -chlorides or mixtures of these.

The following dry composition (parts by weight) is especially adapted for use as a scouring cleanser when used in minor amounts with water in cleaning kitchen ware and enameled ware.

| | |
|---|---|
| Dichloroisocyanuric acid | 0.7 |
| Hexamethylene diamine tetra(methylene phosphonic acid) | 4.1 |
| Cadmium sulfate | 0.2 |
| Sodium dodecylbenzene sulfonate | 4.0 |
| Silica | 91.0 |
| | 100.0 |

EXAMPLE V

For dishwashing compositions, the following additives within the range specified when incorporated with a chlorine-releasing agent give an effective formulation.

| | |
|---|---|
| Chlorine-releasing agent [1] percent available chlorine per total weight of formulation | .5 to 2.0 |
| Additives, percent by weight: | |
| Stabilizing material (aluminum nitrate) | 0.01 to 15 |
| Threshold-sequestering amino phosphonic acid agent | .00001 to 40 |
| Inorganic phosphate [2] | 0 to 30 |
| Inert additive [3] | 40 to 80 |
| Organic anionic surfactant | 0 to 5 |

[1] Chlorinated trisodium phosphate, trichloroisocyanuric acid, dichloroisocyanuric acid, sodium dichloroisocyanurate, potassium dichloroisocyanurate or mixtures of these.
[2] Sodium or potassium -tripolyphosphate, -pyrophosphate, -orthophosphate or mixtures of these.
[3] Sodium or potassium -carbonates, -borates, -silicates, -metasilicates, -sulfates, -chlorides or mixtures of these.

The following dry composition (parts by weight) is especially adapted for use as a machine dishwashing compound when used in amounts to give about 15 to 25 p.p.m. available chlorine in the water.

| | |
|---|---|
| Trichlorocyanuric acid | 1.7 |
| Diethylene triamine penta(methylene phosphonic acid) | 14.0 |
| Aluminum nitrate | 1.0 |
| Sodium tripolyphosphate | 15.0 |
| Sodium sulfate | 53.3 |
| Sodium metasilicate | 15.0 |
| | 100.0 |

EXAMPLE VI

For sanitizing compositions the following additives within the range specified when incorporated with a chlorine-releasing agent give an effective formulation.

| | |
|---|---|
| Chlorine-releasing agent,[1] percent available chlorine per total weight of formulation | 2 to 20 |
| Additives, percent by weight: | |
| Stabilizing material (zinc nitrate) | 0.01 to 15 |
| Threshold-sequestering (amino phosphonic acid) | .00001 to 40 |
| Inorganic phosphate [2] | 0 to 40 |
| Inert additive [3] | 40 to 70 |
| Organic anionic surfactant | 0 to 5 |

[1] Chlorinated trisodium phosphate, trichloroisocyanuric acid, dichloroisocyanuric acid, sodium dichloroisocyanurate, potassium dichloroisocyanurate or mixtures of these.
[2] Sodium or potassium -tripolyphosphate, -pyrophosphate, -orthophosphate or mixtures of these.
[3] Sodium or potassium -carbonates, -borates, -silicates, -metasilicates, -sulfates, -chlorides or mixtures of these.

The following dry composition (parts by weight) is especially adapted for use as a sanitizing compound for use in an aqueous system for cleaning dairy and food equipment when used in an aqueous system to give about 50 to 100 p.p.m. available chlorine.

| | |
|---|---|
| Trichloroisocyanuric acid | 4.0 |
| Amino tri(methylene phosphonic acid) | 14.0 |
| Zinc nitrate | 1.0 |
| Sodium tripolyphosphate | 15.0 |
| Sodium sulfate | 66.0 |
| | 100.0 |

EXAMPLE VII

For household liquid bleaching, the following aqueous composition is provided:

| | |
|---|---|
| Chlorine-releasing agent,[1] percent available chlorine per total weight of composition | 3 to 7 |
| Additives, percent by weight: | |
| Stabilizing material (copper chloride) | 0.01 to 3 |
| Threshold-sequestering (amino phosphonic acid) agent | .00001 to 7 |
| Water | 86 to 96 |

[1] Sodium hypochlorite, calcium hypochlorite, sodium chlorite, lithium hypochlorite or mixtures of these.

The following liquid composition (parts by weight) is especially adapted for use as a household liquid bleach in hard water at a concentration of about 50 p.p.m. to 100 p.p.m. available chlorine for bleaching and stain removal.

| | |
|---|---|
| Sodium hypochlorite | 5.00 |
| Dodecyl amino di(methylene phosphonic acid) | 4.50 |
| Copper chloride | 0.50 |
| Water | 90.00 |
| | 100.00 |

What is claimed is:
1. A bleaching composition consisting essentially of a mixture of
   (a) a chlorine-releasing agent;
   (b) a stabilizing material which provides a metallic ion selected from the group consisting of copper, zinc, aluminum, cadmium, cobalt and nickel when in contact with an aqueous media; and
   (c) a threshold-sequestering agent selected from the group consisting of the compounds having the formula:

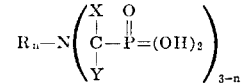

wherein: $n$ is an integer from 0 to 1; R is a member selected from the group consisting of hydrogen, hydrocarbons, halo-substituted hydrocarbons, hydroxy-substituted hydrocarbons, said hydrocarbon groups containing from 1 to 30 carbon atoms, an

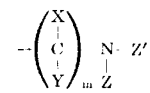

wherein: $m$ is an integer from 1 to 30 inclusive; Z is a member selected from the group consisting of hydrogen and

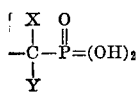

Z' is a member selected from the group consisting of

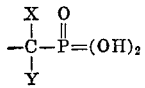

and

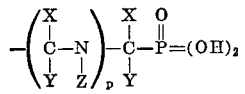

wherein: $p$ is an integer from 1 to 30 inclusive and X and Y are members selected from the group consisting of hydrogen and alkyl groups containing from 1 to 30 carbon atoms; and their water soluble salts; said chlorine-releasing agent and said threshold sequestering agent being present in proportions of between about 1:50 to about 5,000:1 on a percent available chlorine to weight of sequestering agent basis.

2. The composition of claim 1, wherein said threshold-sequestering agent is an alkali metal salt.

3. The composition of claim 1 wherein said threshold-sequestering agent is an amino tri(lower alkylidene phosphonic acid) or water soluble salt thereof.

4. The composition of claim 1 and including a threshold-sequestering agent selected from the group consisting of compounds having the formula:

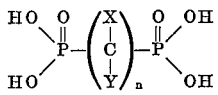

wherein $n$ is an integer from 1 to 10, X is selected from the group consisting of hydrogen and lower alkyl, and Y is selected from the group consisting of hydrogen, hydroxy and lower alkyl, and their water soluble salts.

5. An aqueous bleaching solution consisting essentially of (a) water; (b) a chlorine-releasing agent; (c) a stabilizing material which provides a metallic ion selected from the group consisting of copper, zinc, aluminum, cadmium, cobalt and nickel when in contact with aqueous media; and (d) a threshold-sequestering agent selected from the group consisting of the compounds having the formula:

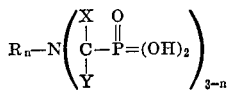

wherein: $n$ is an integer from 0 to 1; R is a member selected from the group consisting of hydrogen, hydrocarbons, halo-substituted hydrocarbons, hydroxy-substituted hydrocarbons, said hydrocarbon groups containing from 1 to 30 carbon atoms, and

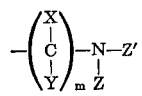

wherein: $m$ is an integer from 1 to 30 inclusive; Z is a member selected from the group consisting of hydrogen and

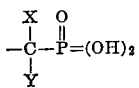

Z' is a member selected from the group consisting of

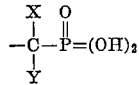

and

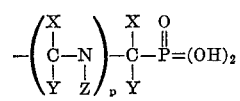

wherein: $p$ is an integer from 1 to 30 inclusive; and X and Y are members selected from the group consisting of hydrogen and alkyl groups containing from 1 to 30 carbon atoms; and their water soluble salts, said chlorine-releasing agent and said threshold-sequestering agent being present in proportions of between about 1:50 to about 5,000:1 on a percent available chlorine to weight of threshold sequestering agent basis.

6. The solution as set forth in claim 5 wherein the threshold-sequestering agent is an alkali metal salt.

7. The solution as set forth in claim 5 wherein said threshold-sequestering agent is an amino tri(lower alkylidene phosphonic acid) or water soluble salt thereof.

8. The solution as set forth in claim 5 and including an additional threshold-sequestering agent selected from the group consisting of compounds having the formula:

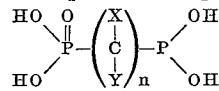

wherein $n$ is an integer from 1 to 10, X is selected from the group consisting of hydrogen and lower alkyl, and Y is selected from the group consisting of hydrogen, hydroxy and lower alkyl; and their water soluble salts.

9. A dry bleaching and sanitizing composition consisting essentially of:
(1) a chlorine-releasing agent selected from the group consisting of chlorinated trisodium phosphates, trichloro-isocyanuric acid, dichloroisocyanuric acid, [(mono-trichloro) tetra-(monopotassium dichloro)] penta-isocyanurate, sodium dichloroisocyanurate, potassium dichloroisocyanurate and mixtures thereof in amounts of between about 2 and about 20% available chlorine per total weight of said composition,
(2) a threshold-sequestering agent selected from the group consisting of compounds having the formula

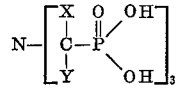

wherein X and Y are each selected from the group consisting of hydrogen and lower alkyl groups, said lower alkyl groups containing from 1 to 4 carbon atoms, and their alkali metal salts in amounts of between about 0.00001 to about 50% by weight,
(3) an inorganic alkali metal phosphate selected from the group consisting of sodium and potassium tripolyphosphates, pyrophosphates, orthophosphates and mixtures thereof in amounts of between 0 to about 50% by weight,
(4) an inert alkali metal inorganic salt selected from the group consisting of sodium and potassium carbonates, borates, silicates, metasilicates, sulfates, chlorides and mixtures of these in amounts of between about 30 to about 75% by weight,
(5) a synthetic organic anionic surfactant in amounts of between 0 to about 10% by weight, selected from the group consisting of sodium alkyl benzene sulfonates and sodium alkyl sulfates containing an alkyl group of from about 8 to 22 carbon atoms, and
(6) a stabilizing material selected from the group consisting of copper, zinc, aluminum, cadmium, cobalt and nickel sulfates, chlorides, and nitrates.

10. The composition as set forth in claim 9 wherein the threshold-sequestering agent is the pentasodium salt of amino tri(methylene phosphonic acid).

11. The composition as set forth in claim 10 and including an additional threshold-sequestering agent which is selected from the group consisting of the sodium and potassium salts of methylene diphosphonic acid and 1-hydroxy, ethylidene diphosphonic acid, said additional threshold-sequestering agent being present in said composition in an amount of between about 0.00001 to about 50% by weight, based on the total weight of the composition.

12. A scouring cleanser composition consisting essentially of:
(1) a chlorine-releasing agent selected from the group consisting of chlorinated trisodium phosphates, trichloroisocyanuric acid, dichloroisocyanuric acid, [(mono-trichloro) tetra-(monopotassium dichloro)] penta-isocyanurate, sodium dichloroisocyanurate, potassium dichloroisocyanurate and mixtures thereof in amounts of between about .2 to about 1.0% available chlorine per total weight of said composition,
(2) a threshold-sequestering agent selected from the group consisting of compounds having the formula

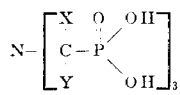

wherein X and Y are each selected from the group consisting of hydrogen and lower alkyl groups, said lower alkyl groups containing from 1 to 4 carbon atoms, and their alkali metal salts in amounts of between about 0.00001 to about 5% by weight,
(3) an inorganic alkali metal phosphate selected from the group consisting of sodium and potassium tripolyphosphates, pyrophosphates, orthophosphates and mixtures thereof in amounts of between 0 to about 4% by weight,
(4) an abrasive selected from the group consisting of silica and feldspar in amounts of between about 90 to about 98% by weight,
(5) a synthetic organic anionic surfactant in amounts of between about 1 to about 5% by weight, selected from the group consisting of sodium alkyl benzene sulfonates and sodium alkyl sulfates containing an alkyl group of from about 8 to 22 carbon atoms,
(6) an alkali metal inorganic salt selected from the group consisting of sodium and potassium carbonates, borates, silicates, metasilicates, sulfates, chlorides and mixtures of these in amounts of between about 0 to 4% by weight, and
(7) a stabilizing material selected from the group consisting of copper, zinc, aluminum, cadmium, cobalt and nickel sulfates, chlorides, and nitrates.

13. The composition as set forth in claim 12 wherein the threshold-sequestering agent is the pentasodium salt of amino tri(methylene phosphonic acid).

14. The composition as set forth in claim 12 and including an additional threshold-sequestering agent which is selected from the group consisting of the sodium and potassium salts of methylene diphosphonic acid and 1-hydroxy, ethylidene diphosphonic acid, said additional threshold-sequestering agent being present in said composition in an amount of between about 0.00001 to about 5% by weight, based on the total weight of the composition.

15. The scouring cleanser composition of claim 14, wherein said additional threshold-sequestering agent is tetrasodium methylene diphosphonate.

16. A dry dishwashing composition consisting essentially of:
(1) a chlorine-releasing agent selected from the group consisting of chlorinated trisodium phosphates, trichloroisocyanuric acid, dichloroisocyanuric acid, [(mono-trichloro) tetra-(monopotassium dichloro)] penta-isocyanurate, sodium dichloroisocyanurate, potassium dichloroisocyanurate and mixtures thereof in amounts of between about .5 to about 2.0% available chlorine per total weight of said composition,
(2) a threshold-sequestering agent selected from the group consisting of compounds having the formula

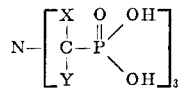

wherein X and Y are each selected from the group consisting of hydrogen and lower alkyl groups, said lower alkyl groups containing from 1 to 4 carbon atoms, and their alkali metal salts in amounts of between about 0.00001 to about 40% by weight.
(3) an inorganic alkali metal phosphate selected from the group consisting of sodium and potassium tripolyphosphates, pyrophosphates, orthophosphates and mixtures thereof in amounts of between 0 to about 30% by weight,
(4) an alkali metal inorganic salt selected from the group consisting of sodium and potassium carbonates, borates, silicates, metasilicates, sulfates, chlorides and mixtures of these in amounts of between about 40 to about 80% by weight,
(5) a synthetic organic anionic surfactant in amounts of between about 0 to about 5% by weight, selected from the group consisting of sodium alkyl benzene sulfonate and sodium alkyl sulfates containing an alkyl group of from about 8 to 22 carbon atoms, and
(6) a stabilizing material selected from the group consisting of copper, zinc, aluminum, cadmium, cobalt and nickel sulfates, chlorides, and nitrates.

17. The dry dishwashing composition of claim 16 wherein said additional threshold-sequestering agent is tetrasodium methylenediphosphonate.

18. A liquid bleaching composition consisting essentially of:
(1) a chlorine-releasing agent selected from the group consisting of sodium hypochlorite, calcium hypochlorite, sodium chlorite, lithium hypochlorite and mixtures thereof, in amounts of between about 3 to about 7% available chlorine per total weight of said composition,
(2) a threshold-sequestering agent selected from the group consisting of compounds having the formula

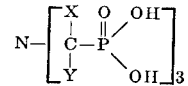

wherein X and Y are each selected from the group consisting of hydrogen and lower alkyl groups, said lower alkyl groups containing from 1 to 4 carbon atoms, and their alkali metal salts in amounts of between about 0.00001 to about 7% by weight,
(3) a stabilizing material selected from the group consisting of copper, zinc, aluminum, cadmium, cobalt and nickel sulfates, chlorides, and nitrates, and
(4) water in amounts of between about 86 to 97% by weight.

19. The composition as set forth in claim 18 wherein the threshold-sequestering agent is the penta sodium salt of amino tri(methylene phosphonic acid).

20. The composition as set forth in claim 18 and including an additional threshold-sequestering agent being present in said composition in an amount of between about 0.00001 to about 7% by weight, based on the total weight of the composition.

References Cited
UNITED STATES PATENTS

| | | | |
|---|---|---|---|
| 3,278,446 | 10/1966 | Irani | 252—152 |
| 3,297,578 | 1/1967 | Crutchfield | 252—99 |
| 3,368,978 | 4/1967 | Irani | 252—137 |

MAYER WEINBLATT, Primary Examiner

U.S. Cl. X.R.

8—108; 252—187